E. R. COX & G. C. GARRISS.
Compost-Distributors.

No. 153,752. Patented Aug. 4, 1874.

WITNESSES:

INVENTOR:

ATTORNEYS.

UNITED STATES PATENT OFFICE.

EDWIN R. COX AND GRAY C. GARRISS, OF GOLDSBOROUGH, N. C.

IMPROVEMENT IN COMPOST-DISTRIBUTERS.

Specification forming part of Letters Patent No. 153,752, dated August 4, 1874; application filed March 7, 1874.

*To all whom it may concern:*

Figure 1:
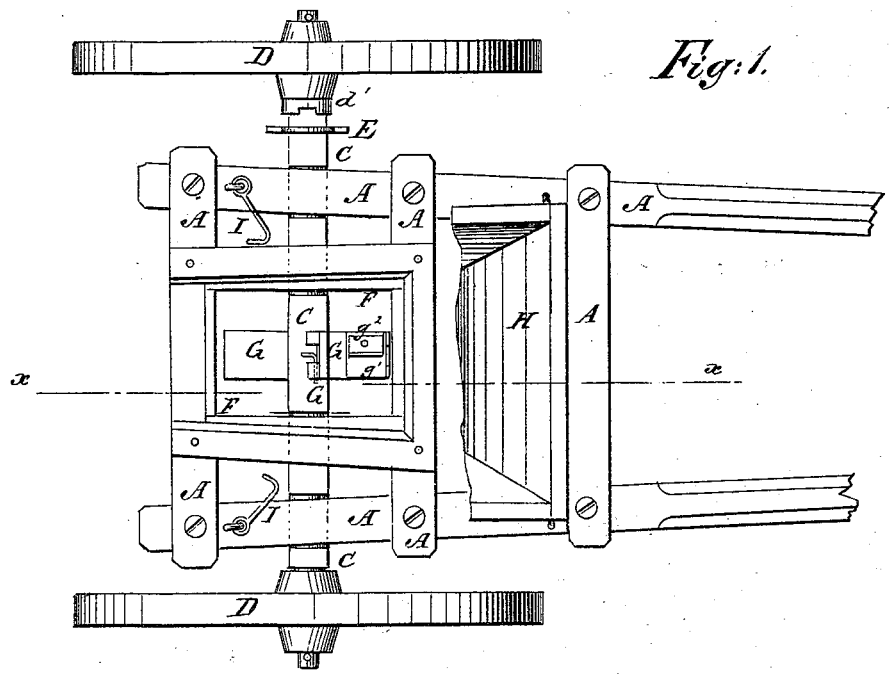
Figure 2:
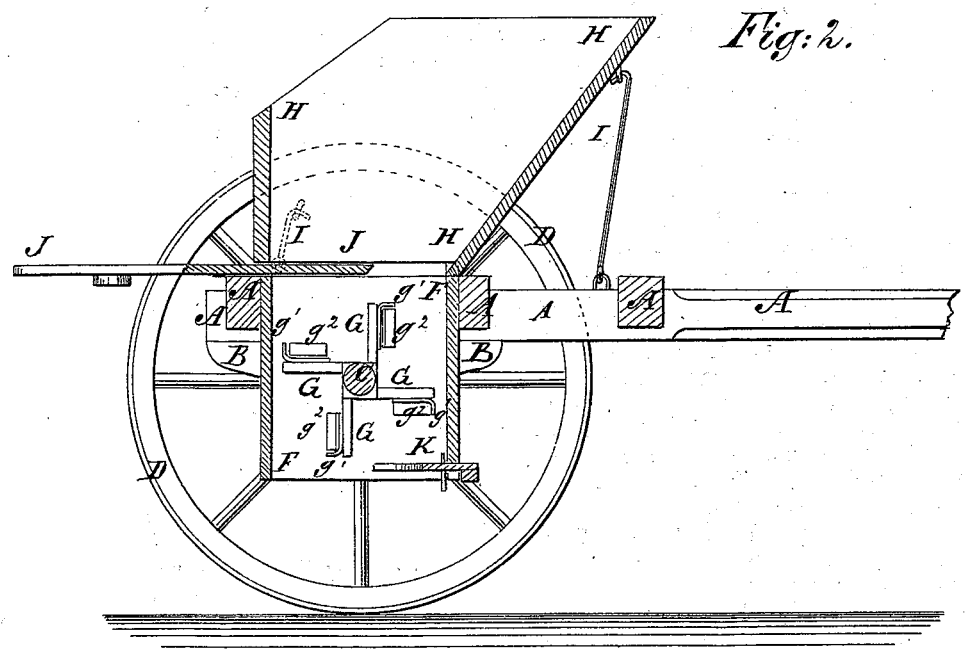

Be it known that we, EDWIN RUFUS COX and GRAY C. GARRISS, of Goldsborough, in the county of Wayne and State of North Carolina, have invented a new and useful Improvement in Drill-Cart or Compost-Distributer, of which the following is a specification:

Figure 1 is a top view of our improved drill-cart, part of the hopper being broken away. Fig. 2 is a vertical longitudinal section of the same, taken through the line $x\,x$, Fig. 1.

Similar letters of reference indicate corresponding parts.

The invention will first be fully described, and then pointed out in the claim.

A represents the frame of any ordinary cart, to the under side of the thills or side bars of which are attached bearing-blocks B, so as to bring the axle C to a suitable distance below the said frame A. D are the wheels, which revolve upon the journals of the axle C. To the inner end of the hub of one of the wheels D is attached a wide band, $d'$, in the projecting edge of which are formed notches to receive a bolt or other clutch, E, so that the said wheel may carry the said axle with it in its revolution. The other wheel D runs loose upon its journal, so that the cart may be turned freely. F is the feed-box, which is securely attached to the frame A, and through the middle part of which the axle C passes. The feed-box F should be about sixteen inches deep, sixteen inches long, and eight inches wide. To the center of the axle C, within the feed-box F, are attached four, more or less, arms, G. To the forward side of the outer ends of each of the arms G are attached two small plates, $g^1$, or a single plate with its outer end notched, the outer ends of which are bent forward, as shown in Figs. 1 and 2, to serve as hooks for drawing the manure from the feed-box. To the forward side of each of the arms G is attached a small plate, $g^2$, the inner side edge of which is bent forward at right angles, as shown in Figs. 1 and 2, to serve as a knife for breaking up any lumps that may be in the manure. H is the hopper or box to receive the manure, and which rests upon the frame A, and is detachably secured to said frame by hooks I, or other convenient fastenings. The box H is made with sloping front and sides, and with a low vertical back, as shown in Fig. 2. The hopper H is made a little wider than the feed-box F, so that the sliding bottom J of said hopper may rest and slide upon the upper edges of said feed-box F. The sliding bottom J passes in through a hole or notch in lower edge of the back of the hopper H, so that it may be partly or wholly drawn out when it is desired to distribute the manure. The forward half of the lower end of the feed-box F is closed by a bottom, K, upon which the manure falls, and from which it is drawn by the hooks of the arms G.

Having thus described our invention, we claim as new and desire to secure by Letters Patent—

A manure-distributing wheel, G, having at the end of its arms a cutter to divide and a hook to drag forward the manure, in the manner set forth.

EDWIN RUFUS COX.
     GRAY C. GARRISS.

Witnesses:
 A. J. FINLAYSON,
 I. F. MILLER.